(12) United States Patent
Dongre et al.

(10) Patent No.: US 8,370,943 B1
(45) Date of Patent: Feb. 5, 2013

(54) LOAD BALANCING OF SCAN REQUESTS TO ALL ANTIVIRUS SERVERS IN A CLUSTER

(75) Inventors: Rommel Dongre, Sunnyvale, CA (US); Isabelle Cnudde, Sunnyvale, CA (US)

(73) Assignee: NETAPP, Inc., Sunnyvale, CA (US)

( * ) Notice: Subject to any disclaimer, the term of this patent is extended or adjusted under 35 U.S.C. 154(b) by 583 days.

(21) Appl. No.: 12/607,834

(22) Filed: Oct. 28, 2009

(51) Int. Cl.
G06F 11/30 (2006.01)
(52) U.S. Cl. ............ 726/24; 726/23; 726/22; 726/25
(58) Field of Classification Search .......... 726/22, 726/23, 24, 25
See application file for complete search history.

(56) References Cited

U.S. PATENT DOCUMENTS

| 6,763,466 | B1 | 7/2004 | Glover | |
|---|---|---|---|---|
| 2002/0103783 | A1* | 8/2002 | Muhlestein | 707/1 |
| 2002/0107877 | A1 | 8/2002 | Whiting et al. | |
| 2003/0110258 | A1* | 6/2003 | Wolff et al. | 709/225 |
| 2004/0010732 | A1 | 1/2004 | Oka | |

* cited by examiner

Primary Examiner — Brandon Hoffman
Assistant Examiner — Samuel Ambaye
(74) Attorney, Agent, or Firm — Blakely, Sokoloff, Taylor & Zafman LLP

(57) ABSTRACT

A system receives a scan request for a storage object in a clustered storage system. The system determines if an antivirus (AV) server is executed on a preferred node in the storage system. The system requests information describing a plurality of nodes on the clustered storage system from a service manager. This information is used to select an alternate AV server which is executed on a substitute node if the initial AV server is not executed on the preferred node. The scan request is sent to the initial AV server if the initial AV server is executed on the preferred node. The scan request is sent to an alternate AV server if the initial AV server is not executed on the preferred node.

30 Claims, 9 Drawing Sheets

600

Status Table

| AV server 610 | Queue Information 630 | Responsiveness 640 |
|---|---|---|
| 1 611 | Accept 631 | Good 641 |
| 2 612 | None 632 | Dead 642 |
| 3 613 | Reject 633 | Full 643 |

LOAD BALANCING OF SCAN REQUESTS TO ALL ANTIVIRUS SERVERS IN A CLUSTER

FIELD OF THE INVENTION

The present invention pertains generally to storage systems, and more particularly, to a method and apparatus for load balancing of scan requests to all antivirus servers in a cluster.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2009, NetApp, Inc., All Rights Reserved.

BACKGROUND OF THE INVENTION

A clustered storage system typically provides data storage and retrieving services. For example, a client requests access to data that is stored on the clustered storage system and the clustered storage system will respond to the request by retrieving the data for the client. The client further requests that the data be scanned for viruses prior to being retrieved. In an alternate embodiment, a system administrator sets up the system such that data is scanned for viruses prior to being retrieved. Generally, a virus is a program or a piece of code that is loaded onto a computer without a user's knowledge and may include any malicious code, program, or other internal component, that could damage, destroy, alter, or take control of, software, firmware, or hardware, or could, in any manner, reveal, damage, destroy, or alter any data or other information accessed through or processed by the computer in any manner. Accordingly, a virus represents an imminent danger to clients that utilize the data storage and retrieval services provided by a clustered storage system.

Therefore, a clustered storage system provides anti-virus scanning of files in order to prevent the loading or transmittal of viruses. Many scan requests are outstanding at once for the cluster and each of those scan requests must be serviced. A requested file may be located on a different node than the node where a scan request is initiated. The scan request may then be sent to another node in order to be serviced, which then may need to access another node in order to read the file. A client's scan request is delayed when it must be sent across several nodes in this manner because many transmissions, or "hops," are required on the cluster network for the scan request to be serviced. Furthermore, given that a clustered storage system handles many clients at one time, many scan requests are potentially outstanding, thereby further bogging down the clustered storage system.

SUMMARY OF THE INVENTION

A system receives a scan request for a storage object in a clustered storage system. The system determines if an initial anti-virus (AV) server is executed on a preferred node in the storage system. The system requests information describing a plurality of nodes on the clustered storage system from a service manager. This information is used to select an alternate AV server which is executed on a substitute node if the initial AV server is not executed on the preferred node. The scan request is sent to the initial AV server if the initial AV server is executed on the preferred node. The scan request is sent to an alternate AV server if the initial AV server is not executed on the preferred node.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limited to the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Scan requests are balanced to all AV servers in a cluster using the topology of the cluster network and the volume location information for a clustered storage system. In one embodiment, the clustered storage system is a clustered file system. The clustered file system first attempts to send the scan request to an initial AV server. In one embodiment, an initial AV server is an AV server located on a preferred node in the storage system. In one embodiment, a preferred node contains the volume where the requested file is located. In one embodiment, if there is no AV server on a preferred node, the clustered file system sends requests to alternate AV servers in the clustered file system using a modified round-robin process. In this embodiment, the modified round-robin process takes into account the topology and location information of the clustered file system, such as queue information and responsiveness of the AV servers. Accordingly, the number of hops across the clustered file system is reduced and the scan requests can be serviced for the client with reduced delay. The modified round-robin algorithm is described below in conjunction with FIGS. 4-9.

Figure 1:
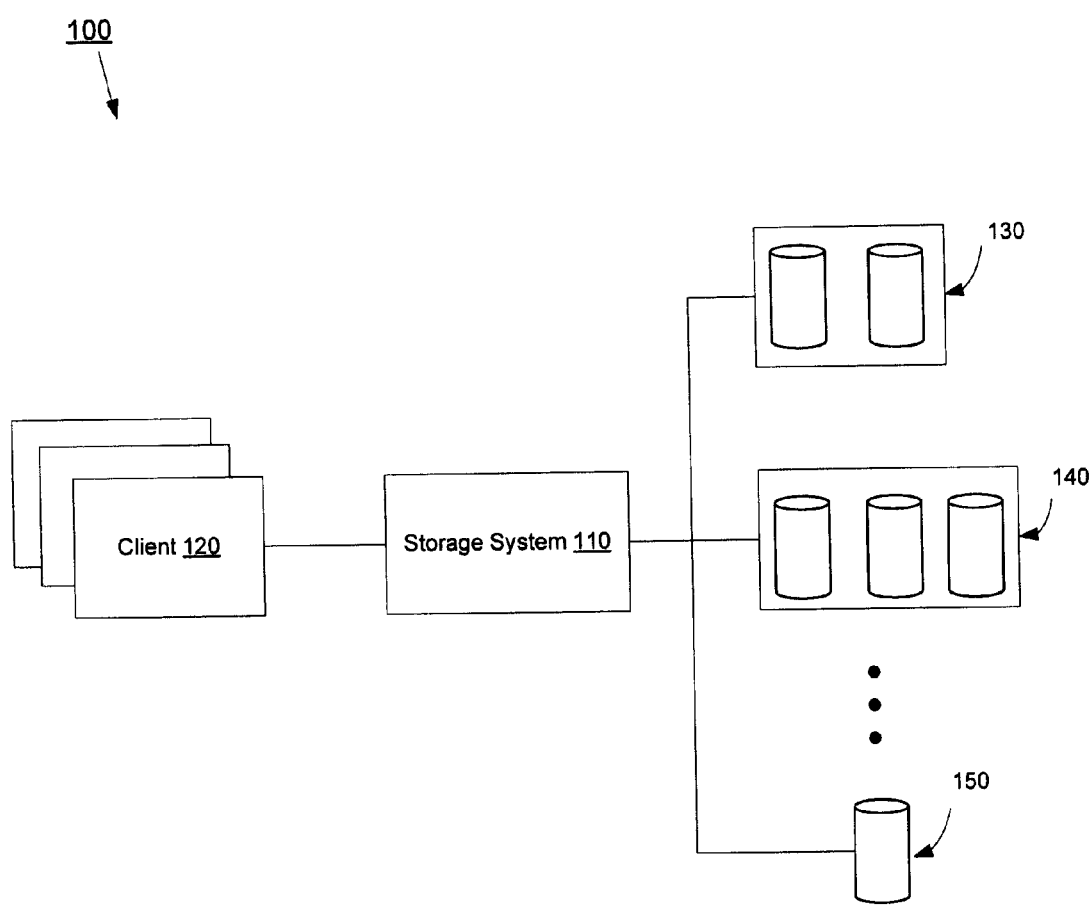
FIG. 1 illustrates a network connection overview of an exemplary system architecture in which embodiments of the present invention may operate.

FIG. 1 shows a network connection overview of an exemplary system architecture 100 in which the scan requests may be performed. System architecture 100 includes storage system 110 and clients 120. Storage system 110 is equipped with security functionality to protect resources, including data contained in storage objects, from viruses. In one embodiment, the storage objects are files in the storage system. In general, the term "virus" refers to a program or piece of code that is loaded onto a computer system without the user's knowledge and runs against the user's wishes. Most viruses are able to replicate themselves, and some of them are even capable of transmitting themselves across a network. A virus also refers to any malicious code that could damage, destroy or alter any resources in a computer system. In one embodiment, the security functionality is implemented as an AV server in the storage system 110, which scans one or more storage objects, or files, for viruses. In one embodiment, scan requests are performed on demand by a system administrator. In an alternate embodiment, a system administrator sets up one or more policies which perform scan requests upon a request for access by a client.

Storage system 110 is responsible for providing storage related services to clients 120. Storage system 110 is able to handle file-based requests and/or block-based requests from clients 120 according to a client/server model of information delivery, allowing clients 120 to access files stored on storage devices 130, 140 and 150.

Storage system 110 may be part of an enterprise network and may include one or more computing devices such as computers, workstations, servers or any other devices, which include a processor and a memory. A storage server is a computer that provides access to information that is stored on one or more storage devices connected to the storage server, such as disk drives ("disks"), flash memories, or storage arrays. The storage server includes an operating system that may implement a storage abstraction layer to logically organize the information as storage objects on the storage devices. With certain logical organizations, the storage abstraction layer may involve a file system which organizes information as a hierarchical structure of directories and files. Each file may be implemented as set of data structures, e.g., disk blocks, configured to store information, such as the actual data for the file. The file system typically organizes such data blocks as a logical "volume," with one or more volumes further organized as a logical "aggregate" for efficiently managing multiple volumes as a group. Each directory, file, volume, and aggregate may then constitute a storage object. In other logical organizations, a file system may also constitute a storage object with the storage abstraction layer managing multiple file systems. Storage system 110 may be implemented as a system that includes a storage area network (SAN) device, a network attached storage (NAS) device, a direct attached storage DAS) device, or any combination of SAN, NAS and DAS.

Storage system 110 communicates with one or more clients 120 directly or via one or more networks. The networks may include a LAN, WAN, intranet, extranet, wireless network, the Internet, etc. Clients 120 may include one or more computing devices such as computers, laptops, workstations, mobile devices, etc. Clients 120 request storage related services to storage system 110 to access files in a volume managed by storage system 110. To that end, clients 120 issue file-based or block-based protocol messages (e.g., in the form of packets) to storage system 110.

Storage system 110 also communicates with various storage devices 130, 140 and 150 directly or via one or more networks. The networks may include a LAN, WAN, intranet, extranet, wireless network, the Internet, etc. Storage devices 130, 140 and 150 may include memories, tapes, disks, and any other optical, electrical or magnetic data recording media.

It will be appreciated that certain embodiments of the present invention may be implemented with solid-state memories including flash storage devices constituting storage array 130, 140 or 150. In one embodiment, mass storage devices 130, 140, and 150 are each a flash-based solid-state device (SSD), sometimes known as flash drives. For example, storage system 110 may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

In one embodiment, storage devices 130, 140 and 150 are managed by storage system 110 as one or more aggregates of volumes (logical or physical) defining an overall logical arrangement of disk space provided by storage devices 130, 140 and 150. In one embodiment, a logical or physical volume is comprised of a cluster of physical disks or portions of physical disks, which can be distributed over one or more networks.

Figure 2:
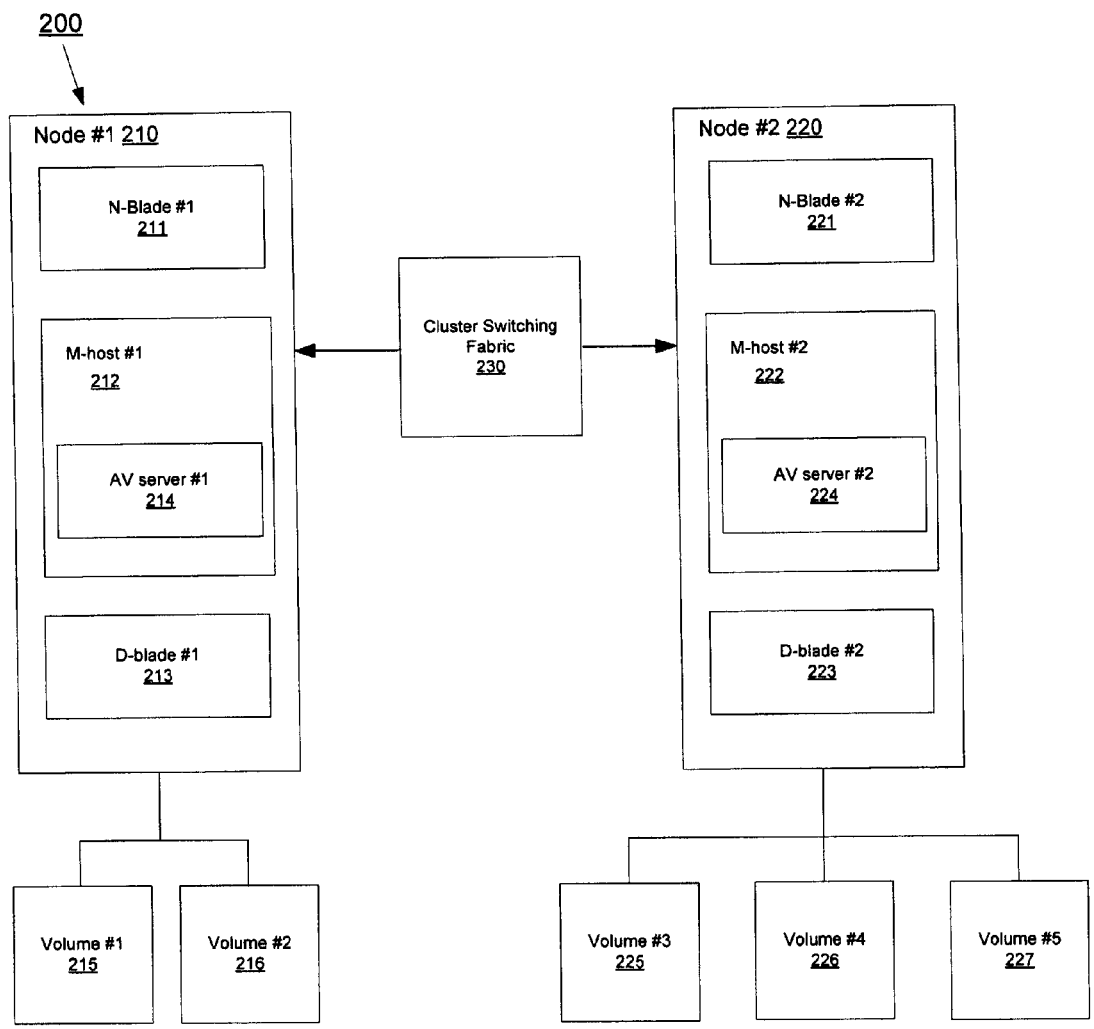
FIG. 2 is a block diagram of an exemplary computer cluster implemented in the storage system shown in FIG. 1.

FIG. 2 is a block diagram of an exemplary computer cluster 200 implemented in the storage system shown in FIG. 1. In one embodiment, computer cluster 200 is storage system 110. In an alternate embodiment, computer cluster 200 is part of storage system 110, which is a group of networked computers to provide storage related services to network clients (e.g., clients 120 shown in FIG. 1).

Computer cluster 200 includes first cluster node 210, second cluster node 220 and cluster switch 230. First cluster node 210 and second cluster node 220 include one or more computing devices, network devices, etc. In this embodiment, first cluster node 210 includes network component (N-blade #1) 211, management component (M-host #1) 212 and data component (D-blade #1) 213, and second cluster node 220 includes network component (N-blade #2) 221, management component (M-host #2) 222, and data component (D-blade #2) 223. N-blades 211 and 221, M-hosts 212 and 222, and D-blades 213 and 223 communicate with one another directly or via a network. Cluster switch 230 includes one or more computing devices and/or one or more network devices to facilitate a connection of cluster nodes 210 and 220. Ethernet may be used as the clustering protocol, and cluster switch 230 may be embodied as a Gigabit Ethernet switch. Although the illustrative cluster architecture shows one-to-one correspondence among the N-blades, the M-hosts and the D-blades, there may be different numbers of N-blades, M-hosts and/or D-blades in a cluster. Alternatively, storage system 110 may not have an N-blade, an M-host, a D-blade, or any combination of those.

N-blades 211 and 221 enable cluster nodes 210 and 220 to connect to network clients or any other network entities over a network, respectively. M-hosts 212 and 222 provide management services, including antivirus management services provided by AV servers 214 and 224, to the network clients. N-blades 211 and 221 receive and process requests from network clients based on various network file system protocols (e.g., Common Internet File System (CIFS), Network File System (NFS), etc.). The processed requests are forwarded to one of D-blades 213 and 223 identified by the requests. For example, a request related to volume 215 is forwarded to D-blade 213. D-blade 213 manages volumes 215 and 216, and D-blade 223 manages volumes 225, 226 and 227. Thus, D-blades 213 and 223 perform the client requests and forward the results to N-blades 211 and 221, which return the results to the network clients.

In particular, each of D-blades 213 and 223 determines which AV server 214 or 224 should process the request in order to balance the load of requests to AV servers 214 or 224 across the cluster of nodes 210 and 220.

Each of volumes 215, 216, 225, 226 and 227 contains one or more files and is defined on groups of disks or parts of disks. In one embodiment, each volume is allocated to one or more RAID groups, and each RAID group belongs exclusively to a single volume. In another embodiment, each volume is a flexible virtual volume that is not tied to one or more physical storage devices (e.g., RAID groups).

Figure 3:
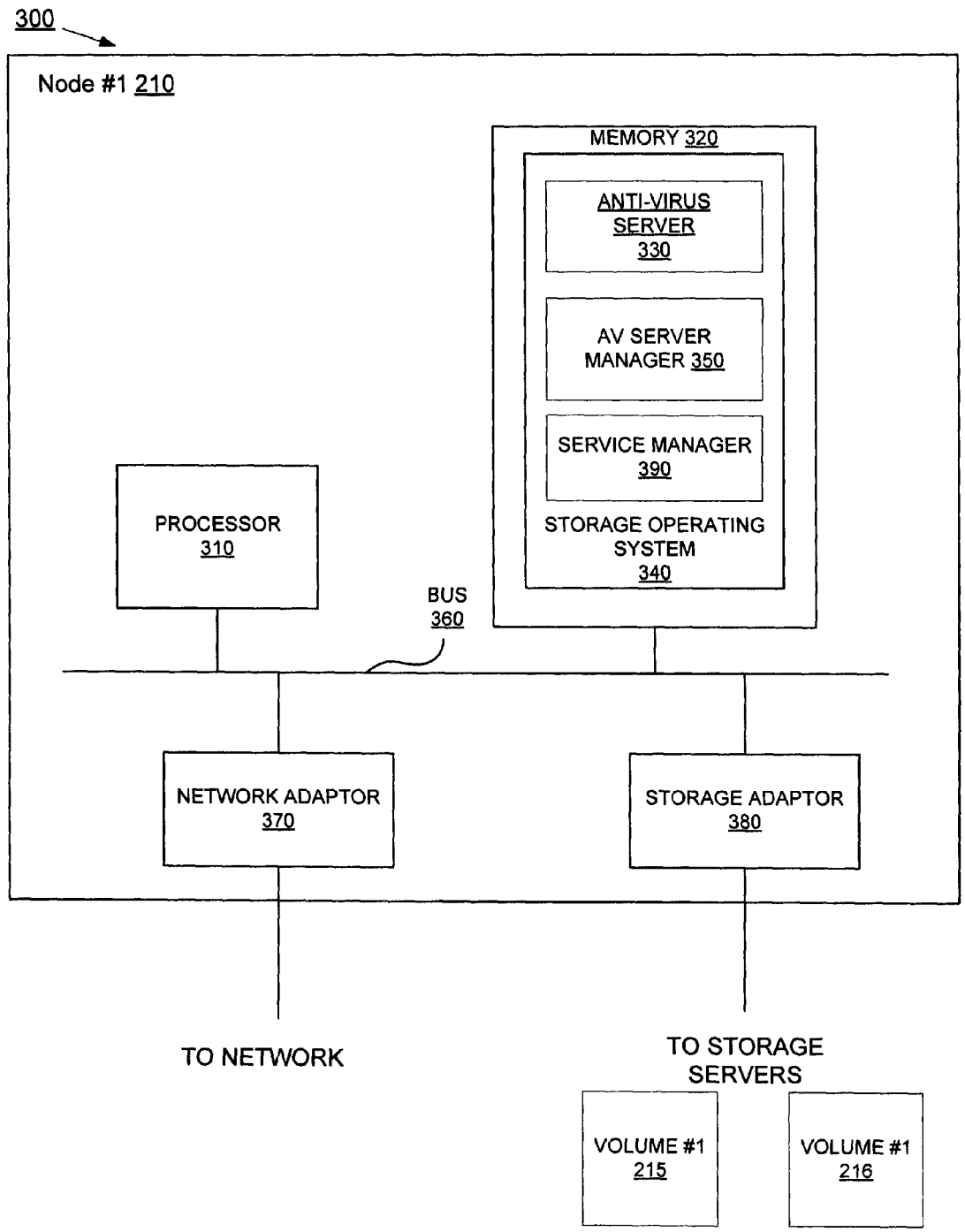
FIG. 3 is a block diagram of an exemplary architecture of the cluster node shown in FIG. 2.

FIG. 3 is a block diagram of an exemplary architecture of cluster node 210 shown in FIG. 2. Cluster node 210 includes processor 310, memory 320, network adaptor 370 and storage adaptor 380 interconnected by system bus 360.

AV server manager 350 determines an AV server to perform a scan request for a file. AV server manager 350 first attempts to send the scan request to an initial AV server. In one embodiment, an initial AV server is an AV server located on a preferred node in the storage system. In one embodiment, a preferred node contains the volume where the requested file is located. In one embodiment, the initial AV server is AV server 330, which is located on the same node 210 as the volume where the requested file is located. This is also the same node on which AV server manager 350 is located. In one embodiment, if there is no AV server 330 located on the same node 210, AV server manager 350 determines an alternate AV server on a substitute node to which to send the scan request. In one embodiment, the substitute node is a non-local node. AV server manager 350 uses a modified round-robin process to make this determination.

Service manager 390 maintains a record of all anti-virus servers located within the cluster. In one embodiment, service manager 390 pulls this record from a database containing configuration information of the current clustered storage system. In one embodiment, this database is implemented as a System Management Framework (SMF). The record includes the corresponding Internet Protocol (IP) addresses of the nodes on which AV server 330 are located. In one embodiment, the record is a table which includes the IP addresses of the nodes. AV server manager 350 pulls, or requests, the record information from service manager 390. In one embodiment, AV server manager 350 requests the record information from service manager 390 every five minutes. AV server manager 350 receives a scan request from a network client and determines an anti-virus server to which to send the request.

Memory 320 encompasses all volatile storage media, such as dynamic random access memory (DRAM) and static RAM (SRAM). Memory 320 includes storage locations that are addressable by processor 310, network adaptor 340, and storage adaptor 360 for storing computer program code and data structures to perform the scan requests. Such computer program code and data structures may be stored in non-volatile storage media, such as any type of disk including floppy disks, optical disks such as CDs, DVDs and BDs (Blu-ray Disks), and magnetic-optical disks, magnetic or optical cards, or any type of media, and may be loaded onto memory 320. Such non-volatile storage media is a part of cluster node 210 or storage system 110. Those skilled in the art will immediately recognize that the term "computer-readable storage medium" includes any type of volatile or non-volatile storage device that is accessible by a processor. Memory 320 further includes anti-virus server 330 for servicing scan requests from one or more nodes in cluster node 210.

Processor 310, network adaptor 370 and storage adaptor 380 include processing elements and/or logic circuitry configured to execute the computer program code and manipulate the data structures. Storage operating system 340, portions of which are typically resident in memory 320 and executed by processor 310, invokes storage operations in support of storage related services for network clients. It will be apparent to those skilled in the art that other processing and memory means, including various computer readable storage media, may be used for storing and executing computer program code pertaining to the scan requests.

Network adaptor 370 includes the mechanical and signaling circuitry needed to connect cluster node 210 to network clients (e.g., clients 120 shown in FIG. 1) directly or via one or more networks. The network clients interact with cluster node 210 in accordance with a client/server model of information delivery. The network clients request the services of cluster node 210, and cluster node 210 returns the results of the services requested by the network clients, by exchanging data packets encapsulated under various protocols (e.g., CIFS, NFS, etc.).

Storage adaptor 380 retrieves information requested by the network clients. The information is stored on volumes 215 and 216 managed by cluster node 210. Storage adaptor 380 includes input/output (I/O) interface circuitry that couples to volumes 215 and 216 over an I/O interconnect arrangement, such as a high-performance, Fibre Channel link topology. The information retrieved by storage adaptor 380 is, if needed, processed by processor 310 (or storage adaptor 380 itself) prior to being forwarded to network adaptor 370. Network adaptor 370 formats the forwarded information into one or more packets and returns the packets to the network clients.

Although in the above embodiment, one single processor and one single memory are illustrated for simplification, one or more processors and/or one or more memories can be implemented for each component or some components of first cluster node 210 (N-blade 211, M-host 212, or D-blade 213 in FIG. 2). In addition, second cluster node 220 of FIG. 2 may be organized similar to first cluster node 210 as discussed above although FIG. 3 only illustrates an exemplary architecture of first cluster node 210 for simplification. Finally, a storage system, which does not have logically or physically divided components (e.g., N-blade 211, M-host 212 and D-blade 213 of FIG. 2), has an architecture similar to first cluster node 210.

Figure 4:
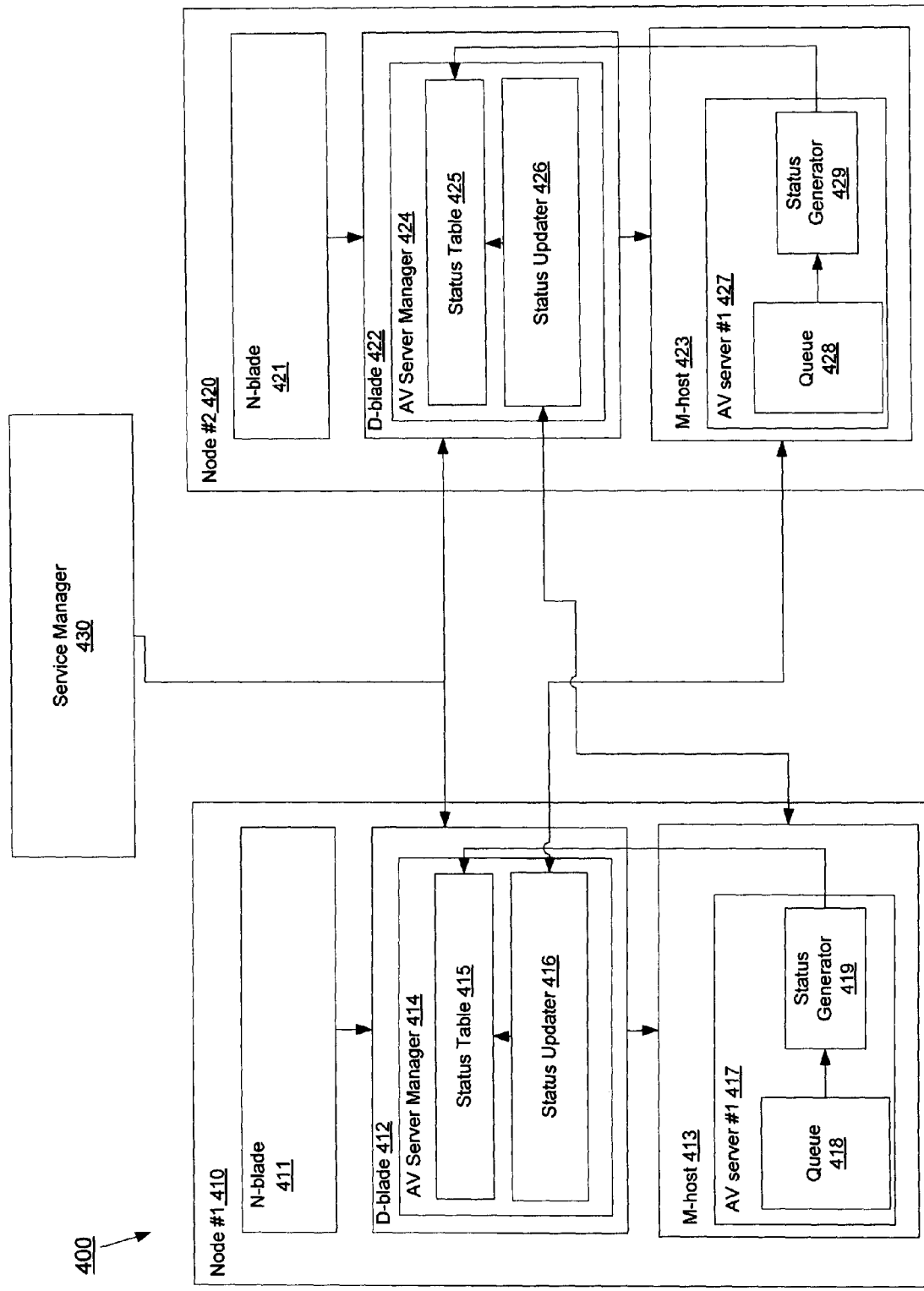
FIG. 4 illustrates an exemplary cluster node in accordance with embodiments of the present invention.

FIG. 4 illustrates an exemplary cluster node 210 of FIG. 2. Referring to FIG. 4, the cluster contains two nodes, Node #1 410 and Node #2 420. Within each node 410 and 420, there is N-blade 411 and 421 respectively, D-blade 412 and 422 respectively, and M-host 413 and 423 respectively.

D-blade 412 receives a scan request from N-blade 411 or 421. D-blade 412 determines which AV server to send the scan requests. D-blade 412 first determines whether there is an initial AV server located on a preferred node. In one embodiment, a preferred node contains the volume where the requested file is located. In one embodiment, the initial AV server is AV server 417 within node 410. If an initial AV server is located in M-host 413, D-blade 412 sends the scan request to the initial AV server. However, if there is no initial AV server located in M-host 413, D-blade determines an alternate AV server on a substitute node based on status table 415. In one embodiment, status table 415 includes AV server 427 as an alternate AV server to which to send the request. In an alternate embodiment, the cluster contains more than two nodes and therefore has additional alternate AV servers to which to send the request. In this alternate embodiment, the determination of which alternate server to send the scan request is performed as described below in conjunction with FIG. 7.

D-blade 412 includes AV server manager 414 to maintain a status table 415 for all the AV servers located on the node. The list of all AV servers located on the node is requested by AV server manager 414 from service manager 430. In one embodiment, AV server managers 414 and 424 request the list from service manager 430 every five minutes. AV server manager 414 maintains a status table 415 based on the list and updates from status updater 416 and status generator 419.

Status updater 416 receives input from M-host 423 upon receiving a response to an outstanding scan request to M-host 423. Status updater 416 calculates the responsiveness of AV server 427 based on the input. Status updater 416 calculations are described below in conjunction with FIG. 8 and FIG. 9.

M-host 413 includes AV server 417 which processes scan requests sent from D-blade 412 or 422. Prior to processing a request, AV server 417 must place the request into queue 418. In one embodiment, queue 418 is a first-in-first-out (FIFO) queue. If queue 418 cannot process the scan request sent from D-blade 412, status generator 419 sends a rejection of the request to D-blade 412. In one embodiment, if the scan request is successfully placed in queue 418 to be processed by AV server 417, status generator 419 sends an acceptance message to D-blade 412 issuing the scan request. In an alternate embodiment, if the scan request is successfully placed in queue 418 to be processed by AV server 417, no message is sent by status generator 419 indicating an acceptance of the scan request.

Figure 5:
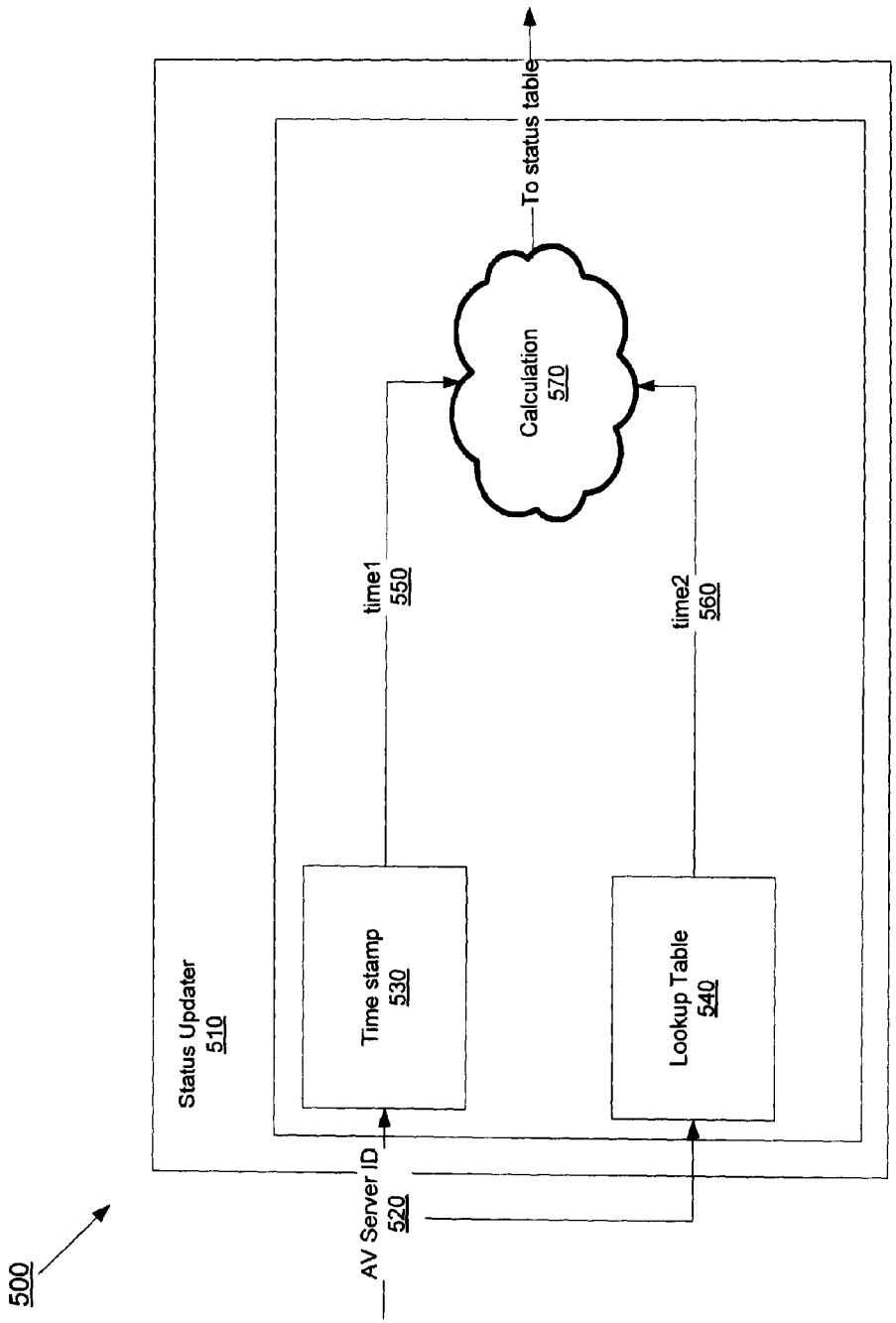
FIG. 5 illustrates an exemplary status updater in accordance with embodiments of the present invention.

FIG. 5 illustrates an exemplary status updater in accordance with D-blade 412 of FIG. 4. Referring to FIG. 5, status updater 510 receives AV server ID 520. In one embodiment, AV server ID 520 is received from the AV server to which a scan request was sent. At the time AV server ID 520 is received, time stamp 530 creates time1 550 indicating the time at which AV server ID 520 was received.

In one embodiment, status updater 510 contains a look up table 540. Look up table 540 contains an entry for each AV server on the cluster and stores a time at which the scan request was sent to a particular AV server. In an alternate embodiment, the time is received from the AV server rather than being stored in look up table 540. AV server ID 520 is used to look up time2 560, corresponding to the time at which a request was sent to the AV server with AV server ID 520.

To calculate the responsiveness of the AV server corresponding to AV server ID 520, time1 550 and time1 560 are transmitted to calculation 570. Calculation 570 subtracts time1 550 from time2 560 to determine the time it took for the AV server with AV server ID 520 to respond to the scan request. Calculation 570 then determines a responsiveness value of "good", "dead" or "full" based on this calculation.

Figure 6:
FIG. 6 illustrates an exemplary status table in accordance with embodiments of the present invention.

FIG. 6 illustrates an exemplary status table in accordance with AV server manager 414 of FIG. 4. Referring to FIG. 6, status table 600 stores information to allow the D-blade on which it is stored to determine an alternate AV server on a substitute node to which to send a scan request if there is no AV server located on a preferred node.

The list of AV servers 610 is requested from a service manager as described above in conjunction with FIG. 4. For each AV server 611, 612, and 613, there is a corresponding queue information value 631, 632, and 633 respectively and a corresponding responsiveness value 641, 642, and 643 respectively. The queue information value has a state value of "Accept", "Reject", or "None". In one embodiment, "Accept" 631 indicates that the AV server to which a scan request was sent has accepted the scan request. "Reject" 633 indicates that the AV server has rejected the scan request which was sent to it. In one embodiment, "None" 632 indicates that a scan request has not been sent to the corresponding AV server. In an alternate embodiment, "None" 632 indicates that a response has not yet been received for an outstanding scan request to the corresponding AV server.

Responsiveness 640 is based on the responsiveness of the corresponding AV server in servicing prior scan requests. "Good" 641 indicates that the response time for the previous scan request sent to the AV server was acceptable. In one embodiment, an acceptable response time is one second or less. In an alternative embodiment, an acceptable response time is less than five seconds. "Dead" 642 indicates that the response for the previous scan request sent to the AV server timed out. In one embodiment, a response to a scan request times out after less than 5 seconds. In an alternate embodiment, a response to a scan request times out after less than 10 seconds. "Full" 643 indicates that the previous request sent to the AV server was rejected. This is to be distinguished from "Reject" 633, which indicates that the current scan request to the AV server was rejected.

Figure 7:
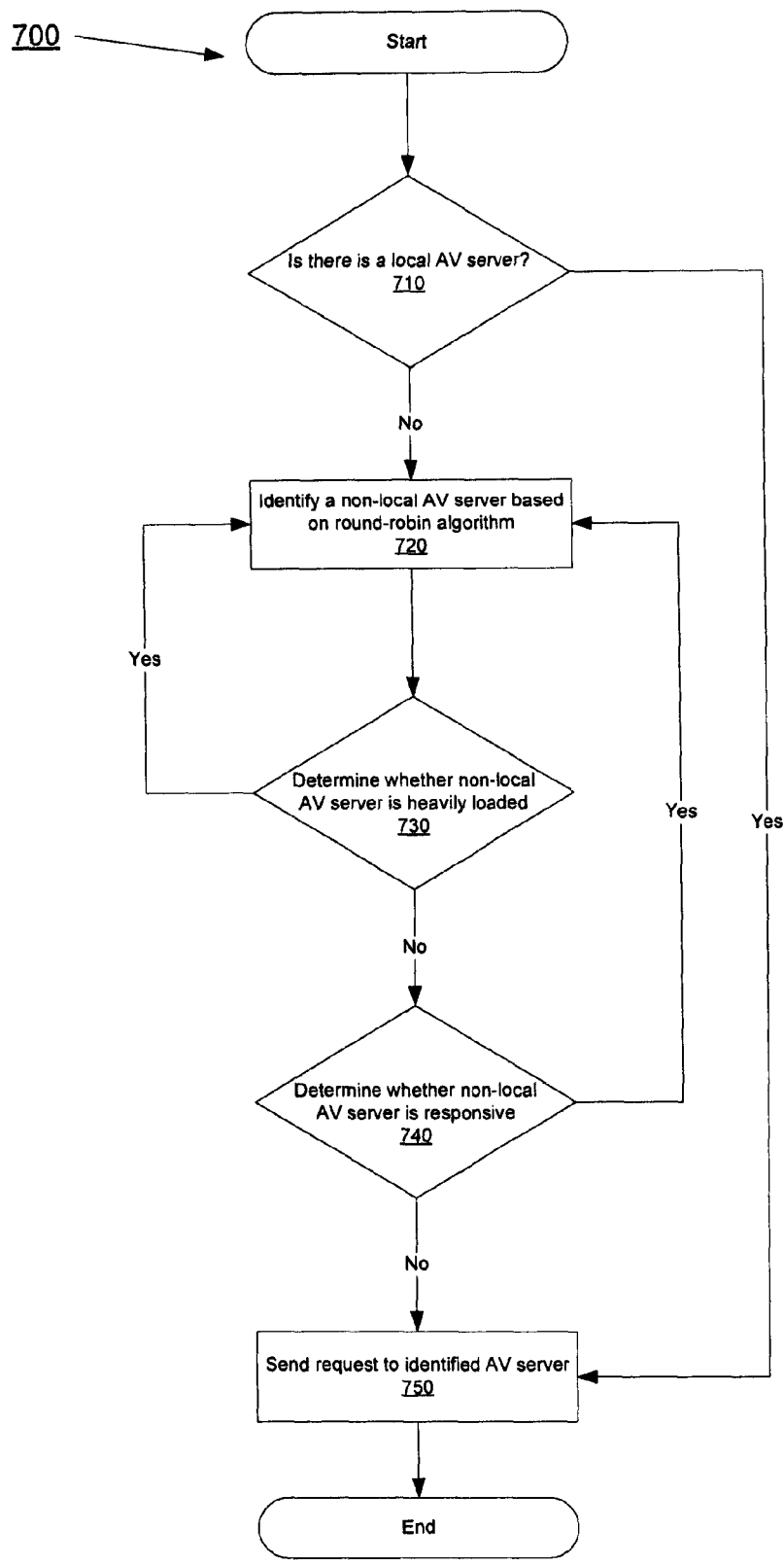
FIG. 7 illustrates a flow diagram of a load balancing method in accordance with embodiments of the present invention.

FIG. 7 illustrates a flow diagram of a load balancing method 700 that can be executed on cluster node 210 of FIG. 2. In one embodiment, the load balancing method 700 is performed by AV server manager 350 of FIG. 3.

Referring to FIG. 7, method 700 determines, at block 710, whether there is an initial AV server to process a scan request received from a network interface. In one embodiment, an initial AV server is determined to exist at block 710 if an identifier of the node on which the initial AV server is located is found in a list of identifiers maintained by the node. In an alternate embodiment, the initial AV server exists if a scan request sent to the node containing the data file for the scan request is successful. In one embodiment, the identifier of the node is an IP address of the node. In one embodiment, the list of identifiers maintained by the node is stored in the status table maintained by the node. In an alternate embodiment, the list of identifiers is a distinct data structure from the status table maintained by the node. In yet another embodiment, the identifier is a bit or a field in a table which is set or populated for a preferred node. In one embodiment, an initial AV server exists if there is an AV server located on a preferred node in the clustered storage system. In one embodiment, a preferred node contains the data file for the scan request. In one embodiment, for a cluster system as shown in FIG. 4, AV server #1

417 is the initial AV server on the preferred node for a request being serviced by D-blade 412. If there is an initial AV server as determined at block 710, method 700 sends the scan request to the initial AV server to be serviced (block 750).

If an initial AV server is not found at block 710, method 700 proceeds to block 720 to determine an alternate AV server located on a substitute node. In one embodiment, the alternate AV server is a non-local AV server. The alternate AV server is determined by executing a modified round robin process using a status table maintained by the node. At block 720, the modified round robin process selects, as the alternate AV server, the next AV server in the list of AV servers in the cluster included in the status table. The list of alternate AV servers maintained in the status table is requested from a service manager of the cluster. In one embodiment, the list is requested from the service manager every five minutes. The service manager maintains the list by pulling information from a database containing configuration information of the current clustered storage system. In one embodiment, this database is implemented as a System Management Framework (SMF). By requesting the list of alternate AV servers frequently, the storage interface ensures that there is an up-to-date list of all the AV servers on the node. The efficiency of the system is therefore improved because there is less likelihood that the scan request will be sent to an AV server which is no longer on the node. In one embodiment, upon pulling the list of AV servers, the storage interface creates a status table with one entry per AV server in the list. In an alternate embodiment, the storage interface resets an existing status table upon pulling the list of AV servers. Once the status table is created or reset, it is updated and maintained by the storage interface.

At block 730, a determination is made as to whether the alternate AV server selected by the modified round-robin process is heavily loaded. In one embodiment, for a cluster as shown in FIG. 4, status table 415 or 425 indicates whether the alternate AV server is heavily loaded. The alternate AV server is considered heavily loaded if the queue information for that alternate AV server has a state value of "Reject". In one embodiment, an alternate AV server will have a state value of reject if the storage interface receives a reject message from the alternate AV server. The reject message indicates that the alternate AV server was not able to place the scan request into its queue to be processed. If the alternate AV server is heavily loaded, method 700 returns to block 720 to determine a next alternate AV server in the modified round-robin process.

If the alternate AV server is not heavily loaded, indicated by a queue information state value of "None" or "Accept", the process continues to block 740. In one embodiment, the queue information statue value of an alternate AV server will have a value of "None" if no message was received by the storage interface indicating whether or not the scan request was accepted or rejected. In one embodiment, the queue information state value of an alternate AV server will have a value of "Accept" upon receiving a message from the alternate AV server that the scan request was accepted. The queue information state values are described below in conjunction with FIG. 8.

At block 740, a determination is made as to whether the alternate AV server is responsive. In one embodiment, an alternate AV server is responsive if the responsiveness state value of the alternate AV server is "Good." If the alternate AV server is responsive, the scan request is sent to the alternate AV server at block 750.

If the alternate AV server is not responsive, as indicated by a responsiveness state value of "Dead" or "Full", method 700 returns to block 720 to determine a next alternate AV server in the modified round-robin process. In one embodiment, an alternate AV server has a responsiveness state value of "Dead" if the alternate AV server did not respond to a scan request for a predetermined about of time. In an alternate embodiment, an alternate AV server has a responsiveness state value of "Full" if the alternate AV server rejects a scan request from the storage interface. The responsiveness state value calculations are described below in conjunction with FIG. 9.

Figure 8:
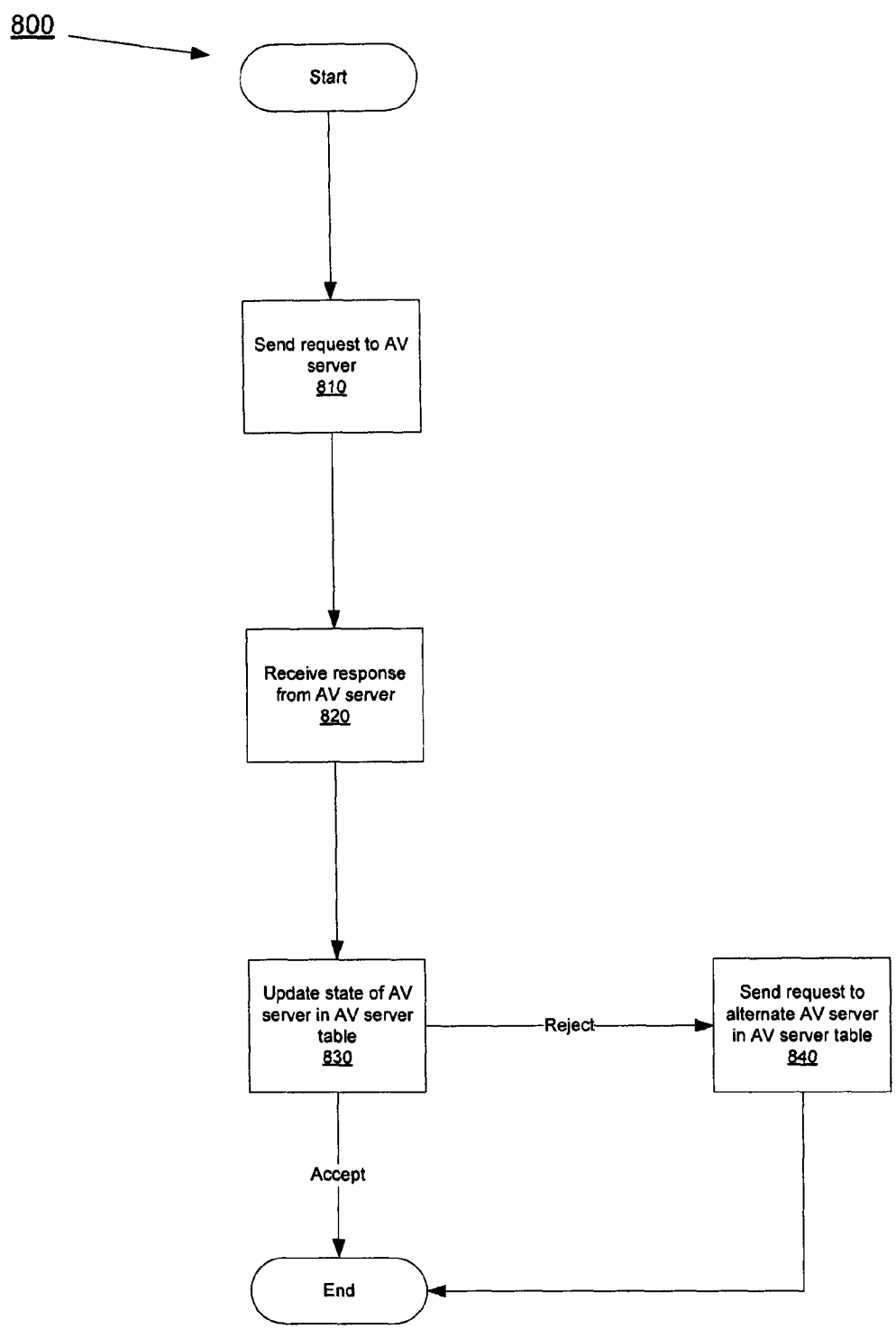
FIG. 8 illustrates a flow diagram of an update to a status table in accordance with embodiments of the present invention.

FIG. 8 illustrates a flow diagram of an update to a status table which changes a state value of the responsiveness of an alternate AV server. In one embodiment, the responsiveness update method 800 is performed by the AV Server Manager 414 of FIG. 4.

Referring to FIG. 8, method 800 sends a request to an alternate AV server as selected by the method of FIG. 7 (block 710). A response for the request is received from the alternate AV server to which the request was sent at block 820. In one embodiment, for a cluster as shown in FIG. 4, the queue information value of the AV server is updated in the status table 415 of the D-blade 412 which sent out the request. In an alternate embodiment, the queue information value of the AV server is updated in the status table maintained by a storage interface in a clustered storage system. In one embodiment, if the response from the alternate AV server is a rejection, the queue information value for the corresponding entry in the status table is updated to "Reject." At block 840, if the response from the alternate AV server is a rejection, the scan request is sent by the storage interface to a different alternate AV server using the AV server status table as described above in conjunction with FIG. 7. In one embodiment, if the response from the alternate AV server indicates an acceptance, the queue information value for the alternate AV server's entry in the status table is updated to "Accept." In an alternate embodiment, there is no response from the alternate AV server if the alternate AV server has accepted the scan request. In this alternate embodiment, the queue information state value will not be updated. In one embodiment, the alternate AV server sends a message to the storage interface once the scan request has been completed. The queue information value for the entry in the status table for the alternate AV server is updated to "Accept" upon receiving the completion message.

Figure 9:
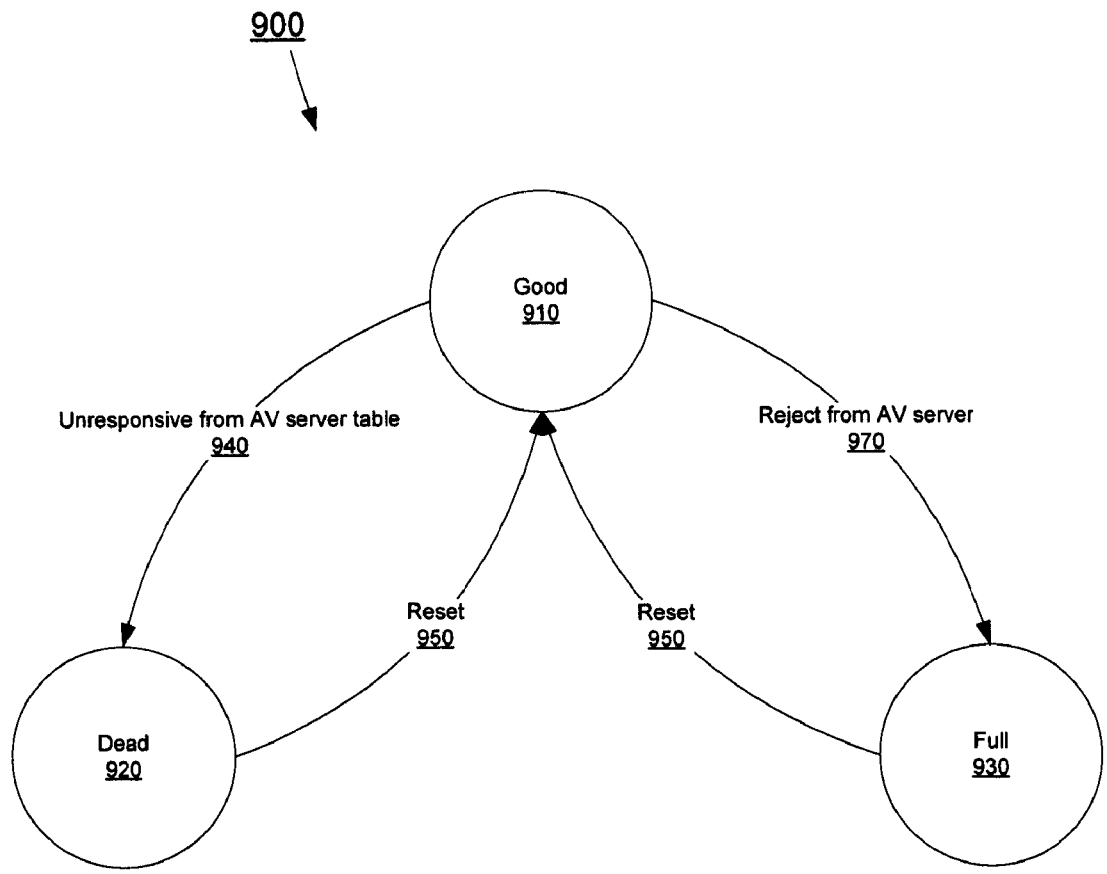
FIG. 9 illustrates a state diagram of an update to a status table in accordance with embodiments of the present invention.

FIG. 9 illustrates a state diagram of an update to a status table. In one embodiment, the state diagram update method 900 is performed by AV Server Manager 414 of FIG. 4. In an alternate embodiment, the state diagram update method 900 is performed by a storage interface of the clustered storage system. Referring to FIG. 9, the responsiveness value of an alternate AV server starts in "Good" state 910. If a request is sent to an alternate AV server, and no response is received from the alternate AV server in a predetermined amount of time 940, the responsiveness state for that alternate AV server is updated to "Dead" at 920. In one embodiment, the predetermined amount of time is 120 seconds. In an alternate embodiment, the predetermined amount of time is 300 seconds. Upon receiving a reset 950 from the storage interface, the responsiveness state is set back to "Good" 910. In one embodiment, reset 950 is received from the storage interlace every 5 seconds. In an alternate embodiment, reset 950 is received from the storage interface every 10 seconds. If a request is sent to an alternate AV server and is rejected by that alternate AV server at 970, the responsiveness value for that alternate AV server is updated to "Full" 930. Upon receiving reset 950, the responsiveness state is set to "Good" 910. In one embodiment, once the responsiveness state is reset to "Good" 910, the outstanding scan requests are retried. In an alternate embodiment, no action is taken for the outstanding scan requests upon a reset of the responsiveness state.

In practice, the methods as described herein may constitute one or more programs made up of computer-executable instructions. Describing the method with reference to the flow diagrams in FIG. 7, FIG. 8, and FIG. 9 enables one skilled in the art to develop such programs, including such instructions to carry out the operations (acts) represented by logical blocks 710-750 of FIG. 7, blocks 810-840 of FIG. 8, and blocks 910-970 of FIG. 9 on suitably configured computers (the processor of the computer executing the instructions from computer-readable media). The computer-executable instructions may be written in a computer programming language or may be embodied in firmware logic or in hardware circuitry. If written in a programming language conforming to a recognized standard, such instructions can be executed on a variety of hardware platforms and for interface to a variety of operating systems.

The methods as described herein are not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the methods 600, 700, 800, and 900 in FIG. 6, FIG. 7, FIG. 8, and FIG. 9 respectively without departing from the scope of the invention and that no particular order is implied by the arrangement of blocks shown and described herein.

The foregoing description has been directed to particular embodiments of the disclosure. However, it will be apparent that other variations and modifications may be made to the described embodiments with the attainment of some or all of their advantages. Specifically, it should be noted that the principles of the disclosure may be implemented in a non-distributed file system. Furthermore, while this description has been written in terms of D-blades, N-blades, and M-hosts, the teachings of the present disclosure are equally suitable to systems in which the functionality of the D-blades, N-blades, and M-hosts are implemented in a single system. Alternatively, the functions of the D-blades, N-blades, and M-hosts may be distributed among a number of separate systems, wherein in each system performs one or more functions. Additionally, some of the features of the present disclosure have been described with respect to a cluster, containing two nodes, however, it is equally applicable to clusters including a plurality of nodes, which allow for an n-way failover.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, by a first node of a plurality of nodes in a clustered storage system, a scan request for a storage object located on a volume of a second node in the clustered storage system, wherein the clustered storage system further includes a plurality of anti-virus (AV) servers executing on a set of two or more of the plurality of nodes, and wherein each of the plurality of nodes includes one or more volumes storing storage objects;
determining, by the first node, if an initial anti-virus (AV) server of the plurality of AV servers is executing on the second node in the clustered storage system;
pulling information describing the AV servers executing on the set of the plurality of nodes in the clustered storage system from a service manager;
selecting an alternate AV server executing on a substitute node of the plurality of nodes if the initial AV server is not executing on the second node, wherein the selecting uses the pulled information to select the alternate AV server according to a modified round-robin process, the modified round-robin process utilizing one or more of queue information for at least one of the AV servers and responsiveness information for at least one of the AV servers; and
sending the scan request to the initial AV server if the initial AV server is executing on the second node and to the alternate AV server if the initial AV server is not executing on the second node.

2. The method of claim 1, wherein the responsiveness information of an AV server comprises a responsiveness state value indicating a responsiveness of the AV server in servicing one or more prior can requests, and wherein the queue information of the AV server comprises a queue information state value indicating whether a previous scan request was accepted by the AV server.

3. The method of claim 1, wherein the modified round-robin process selects a current AV server as the alternate server if the current AV server has a queue information state value which is positive and a next AV server as the alternate AV server if the current AV server has a queue information state value which is negative.

4. The method of claim 3, further comprising:
retrieving the responsiveness state value of the next AV server from a status table, the responsiveness state value selected from the group consisting of good, dead, and full.

5. The method of claim 4, further comprising:
selecting a following AV server as the alternate AV server instead of the next AV server if the next AV server does not have a responsiveness state value of good.

6. A method comprising:
sending, by a data server executing on a processor of a node, a request to scan a storage object to an initial anti-virus (AV) server;
receiving a response from the initial AV server;
updating a responsiveness state value of the initial AV server in a status table according to the response received from the initial AV server, the status table comprising responsiveness state values for a plurality of AV servers; and
responsive to the response from the initial AV server indicating a rejection of the request:
determining an alternate AV server using a modified round-robin process, the modified round-robin process utilizing one or more of queue information of the alternate AV server and the responsiveness state value of the alternate AV server, and
sending the request to the alternate AV server.

7. The method of claim 6, wherein the responsiveness state value of an AV server indicates a responsiveness of the AV server in servicing one or more prior scan requests, and wherein the queue information of the server comprises a queue information state value indicating whether a previous scan request was accepted by the AV server.

8. The method of claim 6, further comprising:
updating the responsiveness state value of an AV server of the plurality of AV servers in the status table to a state value of good if a reset is received for the AV server;
updating the responsiveness state value of the AV server in the status table to a state value of dead if the AV server does not respond to a scan request for a predetermined amount of time; and
updating the responsiveness state value of the server to a state value of full if a response from the AV server comprises a rejection of a scan request from the AV server.

9. The method of claim 8, wherein the reset is received for the AV server after the AV server has timed out.

10. The method of claim 6, further comprising:
resetting a queue information state value for each of the plurality of AV servers in the status table upon receiving a reset for the status table; and
updating the queue information state value of an AV server of the plurality of AV servers upon receiving a response to a request sent to the AV server.

11. The method of claim 10, wherein the queue information state value of the AV server is updated to a state value of accept upon receiving a response from the AV server indicating that a scan request has been completed.

12. The method of claim 10, wherein the queue information state value of the AV server is updated to a state value of reject upon receiving a response from the AV server indicating that a scan request cannot be completed.

13. A non-transitory computer-readable storage medium comprising executable instructions to cause a processor of a first node of a plurality of nodes in a storage system to perform operations, the operations comprising:
receiving a scan request for a storage object located on a volume of a second node in the storage system, wherein the storage system further includes a plurality of anti-virus (AV) servers executing on a set of two or more of the plurality of nodes, and wherein each of the plurality of nodes includes one or more volumes storing storage objects;
determining if an initial anti-virus (AV) server of the plurality of AV servers is executing on the second node in the storage system;
pulling information describing the AV servers executing on the set of the plurality of nodes from a service manager;
selecting an alternate AV server executing on a substitute node of the plurality of nodes if the initial AV server is not executing on the second node, wherein the selecting uses the pulled information to select the alternate AV server according to a modified round-robin process, the modified round-robin process utilizing one or more of queue information for at least one of the AV servers and responsiveness information for at least one of the AV servers; and
sending the scan request to the initial AV server if the initial AV server is executing on the second node and to the alternate AV server if the initial AV server is not executing on the second node.

14. The non-transitory computer-readable storage medium of claim 13, wherein the responsiveness information of an AV server comprises a responsiveness state value indicating a responsiveness of the AV server in servicing one or more prior scan requests, and wherein the queue information of the AV server comprises a queue information state value indicating whether a previous scan request was accepted by the AV server.

15. The non-transitory computer-readable storage medium of claim 13, wherein the modified round-robin process selects a current AV server as the alternate AV server if the current AV server has a queue information state value which is positive and a next AV server as the alternate AV server if the current AV server has a queue information state value which is negative.

16. The non-transitory computer-readable storage medium of claim 15, wherein the operations further comprise:
retrieving the responsiveness state value of the next AV server from a status table, the responsiveness state value selected from the group consisting of good, dead, and full.

17. The non-transitory computer-readable storage medium of claim 16, wherein the operations further comprise:
selecting a following AV server as the alternate AV server instead of the next AV server if the next AV server does not have a responsiveness state value of good.

18. A non-transitory computer-readable storage medium comprising executable instructions to cause a processor to perform operations, the operations comprising:
sending, by a data server, a request to scan a storage object to an initial anti-virus (AV) server;
receiving a response from the initial AV server;
updating a responsiveness state value of the initial AV server in a status table according to the response received from the initial AV server, the status table comprising responsiveness state values for a plurality of AV servers; and
responsive to the response from the initial AV server indicating a rejection of the request:
determining an alternate AV server using a modified round-robin process, the modified round-robin process utilizing one or more of queue information of the alternate AV server and the responsiveness state value of the alternate AV server, and
sending the request to the alternate AV server.

19. The non-transitory computer-readable storage medium of claim 18, wherein the responsiveness state value of an AV server indicates a responsiveness of the AV server in servicing one or more prior scan requests, and wherein the queue information of the AV server comprises a queue information state value indicating whether a previous scan request was accepted by the AV server.

20. The non-transitory computer-readable storage medium of claim 18, wherein the operations further comprise:
updating the responsiveness state value of an AV server of the plurality of AV servers in the status table to a state value of good if a reset is received for the AV server;
updating the responsiveness state value of the AV server in the status table to a state value of dead if the AV server does not respond to a scan request for a predetermined amount of time; and
updating the responsiveness state value of the AV server to a state value of full if a response from the AV server comprises a rejection of a scan request from the AV server.

21. The non-transitory computer-readable storage medium of claim 20, wherein the reset is received for the AV serve if the AV server has timed out.

22. The non-transitory computer-readable storage medium of claim 18, wherein the operations further comprise:
resetting a queue information state value for each of the plurality of AV servers in the status able upon receiving a reset for the status table; and updating a queue information state value of an AV server of the plurality of AV servers in the status table upon receiving a response to a request sent to the AV server.

23. The non-transitory computer-readable storage medium of claim 22, wherein the queue information state value of the AV server is updated to a state value of accept upon receiving a response from the AV server indicating that a scan request has been completed.

24. The non-transitory computer-readable storage medium of claim 22, wherein the queue information state value of the AV server is updated to a state value of reject upon receiving a response from the AV server indicating that a scan request cannot be completed.

25. A computer system to act as a first node of a plurality of nodes in a storage system, comprising:
   a processor coupled to a memory through a bus;
   a network interface coupled to the memory through the bus, the network interface to send a scan request for a storage object located on a volume of a second node in the storage system, wherein the storage system further includes a plurality of anti-virus (AV) servers executing on a set of two or more of the plurality of nodes; and wherein each of the plurality of nodes includes one or more volumes storing storage objects; and
   a storage interface coupled to the memory and to a plurality of storage servers through the bus, the storage interface to:
      receive the scan request,
      determine if an initial anti-virus (AV) server of the plurality of AV servers is executing on the second node in the storage system,
      pull information describing the AV servers executing on the set of the plurality of nodes from a service manager,
      select an alternate AV server executing on a substitute node of the plurality of nodes if the initial AV server is not executing on the second node, wherein the selecting uses the pulled information to select the alternate AV server according to a modified round-robin process, the modified round-robin process utilizing one or more of queue information for at least one of the AV servers and responsiveness information for at least one of the AV servers, and
      send the scan request to the initial AV server if the initial AV server is executing on the second node and to the alternate AV server if the initial AV server is not executing on the second node.

26. The computer system of claim 25, wherein the responsiveness information of an AV server comprises a responsiveness state value indicating a responsiveness of the AV server in servicing one or more prior scan requests, and wherein the queue information of the AV server comprises a queue information state value indicating whether a previous scan request was accepted by the AV server.

27. A computer system comprising:
   a processor coupled to a memory through a bus; and
   a process executed from the memory by the processor to cause the processor to:
      send a request to scan a storage object to an initial anti-virus (AV) server,
      receive a response from the initial AV server,
      update a responsiveness state value of the initial AV server in a status table according to the response received from the initial AV server, the status table to comprise responsiveness state values for a plurality of AV servers, and
      responsive to the response from the initial AV server indicating a rejection of the request,
         determine an alternate AV server using a modified round-robin process, the modified round-robin process utilizing one or more of queue information of the alternate AV server and the responsiveness state value of the alternate AV server, and
         send the request to the alternate AV server.

28. The computer system of claim 27, wherein the responsiveness state value of an AV server indicates a responsiveness of the AV server in servicing one or more prior scan requests, and wherein the queue information of the AV server comprises a queue information state value indicating whether a previous scan request was accepted by the AV server.

29. The computer system of claim 27, wherein the process further causes the processor to:
   update the responsiveness state value of an AV server of the plurality of AV servers in the status table to a state value of good if a reset is received for the AV server;
   update the responsiveness state value of the AV server to a state value of dead if the AV server does not respond to a scan request for a predetermined amount of time; and
   update the responsiveness state value of the AV server to a state value of full if a response from the AV server comprises a rejection of a scan request from the AV server.

30. The computer system of claim 27, wherein the process further causes the processor to:
   reset a queue information state value for each of the plurality of AV servers in the status table upon receiving a reset for the status table; and
   update a queue information state value of an AV server of the plurality of AV servers in the status table upon receiving a response to a request sent to the AV server.

* * * * *